(12) United States Patent
McKeeth

(10) Patent No.: US 6,411,693 B1
(45) Date of Patent: Jun. 25, 2002

(54) LONG DISTANCE MODEM WARNING

(75) Inventor: James A. McKeeth, Nampa, ID (US)

(73) Assignee: Micron Technolgy, Inc., Boise, ID (US)

(*) Notice: Subject to any disclaimer, the term of this patent is extended or adjusted under 35 U.S.C. 154(b) by 0 days.

(21) Appl. No.: 09/479,884

(22) Filed: Jan. 10, 2000

(51) Int. Cl.[7] .................. H04M 15/00; H04M 3/00; H04M 1/00
(52) U.S. Cl. ............... 379/130; 379/93.02; 379/114.14; 379/188; 379/350
(58) Field of Search ................. 379/111, 112, 379/113, 114, 120, 121, 188–194, 196–200, 210, 114.03, 114.14, 130, 350, 355.02; 399/90.01, 91.02, 93.01, 93.02, 93.03, 93.05

(56) References Cited

U.S. PATENT DOCUMENTS

| | | |
|---|---|---|
| 3,873,781 A | 3/1975 | Nissim |
| 5,425,085 A * | 6/1995 | Weinberger et al. ........ 379/112 |
| 5,535,265 A | 7/1996 | Suwandhaputra |
| 5,802,304 A | 9/1998 | Stone |
| 5,999,525 A * | 12/1999 | Krishnaswamy et al. ... 370/352 |

FOREIGN PATENT DOCUMENTS

EP WO 98/30008 * 7/1998 ............ H04M/7/00

* cited by examiner

Primary Examiner—Binh Tieu
(74) Attorney, Agent, or Firm—Perkins Coie LLP (57) ABSTRACT

A computer implemented method is disclosed for automatically intercepting and analyzing computer modem commands for toll characteristics andthen alternatively permitting or preventing the computer modem command based on the results of the toll analysis and user preferences. The computer modem command is analyzed by extracting any proposed telephone dialing instructions and comparing the proposed telephone number to be dialed with data provided by the local telephone service provider (TSP) in order to determine whether the proposed telephone number would result in a "toll call," or telephone service charges over and above the usual monthly rate, if transmitted to the modem. If a telephone service charge would result, the computer user is notified and prompted to give further instructions concerning whether the toll call should be placed.

37 Claims, 5 Drawing Sheets

LONG DISTANCE MODEM WARNING

BACKGROUND OF THE INVENTION

1. Field of the Invention

The present invention relates to the field of computer telecommunications and, more particularly to avoiding unintended telecommunications using a computer modem.

2. Description of the Related Art

The use of computers, especially the personal computer (PC), to connect to information networks has become widespread. More and more computer users are connecting to the Internet or similar networks, but many have difficulty choosing a local network service provider (NSP) of dial-up services to the network. Many NSPs are available in each geographic area, several of which generally provide service in multiple geographic areas with different local telephone numbers for each area.

When a computer user initially sets up network service (i.e. access to the Internet) for a home computer, that user generally interacts with NSP-provided software installed on the computer. To properly configure the software for home use, the user generally is required to respond to questions posed by the NSP-provided software concerning geographic area and telephone area code, the answers to which are used to select a local access telephone number. This local access telephone number is used by the software to dial into telecommunications facilities for connection to services provided by the NSP. Calls to the local access telephone number are treated like any other call dialed manually, so that tolls charged by the computer user's telephone company for the call to the local access telephone number are the separate responsibility of the computer user, in addition to the fees paid to the NSP.

The process of choosing a local access telephone number is frequently confusing to home computer users, especially those inexperienced with network service and/or the Internet. Many users do not understand the concept of choosing a local access telephone number, or they are confused by the user interface where the choice takes place. In addition, toll information is rarely readily available to assist in selecting a local access telephone number which is a local or toll-free call from the computer user's home location. The result is that many computer users incur unintended telephone service fees when they unwittingly select a toll-incurring access telephone number. Because most telephone service charges are billed monthly, computer users may amass a large amount of unintended telephone service fees, based on the incorrect presumption that they will owe only a flat monthly fee to their chosen NSP.

In order to avoid unintended telephone service fees, the computer user must contact the local telephone service provider (TSP) and request that the operator verify that the chosen access telephone number is a toll-free call. This verification can become a cumbersome process, especially for mobile or portable computer users. Because toll information will vary by geographic location and telephone service plan, computer users wishing to access the network from multiple locations often must choose and verify a different telephone number for each location.

In addition, nefarious programs exist on the network that can automatically instruct a computer to place high-toll calls without the computer user's consent or knowledge. These so-called "Trojan Horse" programs can be accidentally received and installed from an information network, so that computer users may unintentionally incur very large telephone service charges in a short period of time, for example by placing international calls or calls to 900-numbers. Also, unintended telephone service fees can be incurred by secondary computer users, such as children, employees, or guests, without the knowledge or consent of the primary computer user.

Prior art systems have addressed the problem of unintended telephone service fees by noting the computer user when dialing by modem is attempted for all calls and allowing the computer user to confirm or cancel dialing. U.S. Pat. No. 5,802,304 (Stone) discloses a network programming interface for automatically dialing to establish a network connection. The Stone system warns the computer user every time a telephone call will be placed by computer modem, and gives the computer user a choice to dial or cancel dialing. This system fails to analyze the telephone number for toll characteristics.

U.S. Pat. No. 5,535,265 (Suwandhaputra) discloses a method for computer monitoring of a telephone line. Suwandhaputra discloses a system that is software configurable to block an outgoing call when the telephone number of the outgoing call matches a predetermined telephone number. This system would prevent a computer user from making an unintended telephone call from a modem, but it requires the computer user to specify a predetermined telephone number for which calling should be blocked. This system fails to distinguish between toll calls and toll-free calls and does not allow selective blocking of calls based on toll characteristics.

U.S. Pat. No. 3,873,781 (Nissim) discloses a system for selectively blocking long distance telephone calls based on the entry of a security code. Nissim discloses a system having the ability to block a long distance call only when a security code was not entered prior to entering the long distance number. The Nissim system prevents unintended long distance calls, but fails to distinguish between toll calls and non-toll calls. At best, it includes a system wherein each number is tested as to whether it is a long distance telephone number, but it fails to distinguish between long distance toll calls and long distance toll-free calls, such as 800-number calls. In addition, this system does not involve a computer and modem and fails to warn and solicit from the user further instructions when a toll call request is transmitted to a computer modem. Accordingly, there is a need and desire for a method of selectively preventing unintended toll dialing from a computer and computer modulator/demodulator, or modem.

SUMMARY OF THE INVENTION

Embodiments of the present invention provide an apparatus and method for warning a computer user if the computer attempts to command the computer modem to place a telephone call that will result in a toll.

Embodiments of the present invention also provide an apparatus and method for preventing a computer modem from placing calls that would result in a toll call if placed, according to user preferences.

Embodiments of the present invention also provide an apparatus and method for designating a number of approved telephone numbers to which the computer modem is permitted to place toll or non-toll calls and preventing the computer modem from placing all other calls.

Embodiments of the present invention also provide an apparatus and method for remotely configuring the list of approved telephone numbers and other administrative features for a client computer practicing the present invention.

The above and other features and advantages may be achieved by a computer implemented method of automatically intercepting and analyzing computer modem commands for toll characteristics and then alternatively permitting or preventing the computer modem command based on the results of the toll analysis and user preferences. The computer modem command is analyzed by extracting any proposed telephone dialing instructions and comparing the proposed telephone number to be dialed with data provided by the local telephone service provider (TSP) in order to determine whether a telephone service charge would result from dialing the telephone number. If a telephone service charge would result, the computer user is notified and prompted to give further instructions concerning whether such a "toll call" should be placed.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

The present invention is intended to operate in conjunction with a variety of different computer configurations and therefore the hardware required to implement it varies considerably from embodiment to embodiment. One embodiment of the present invention may be implemented on a personal computer system 100 as shown in FIG. 7.

Figure 7:
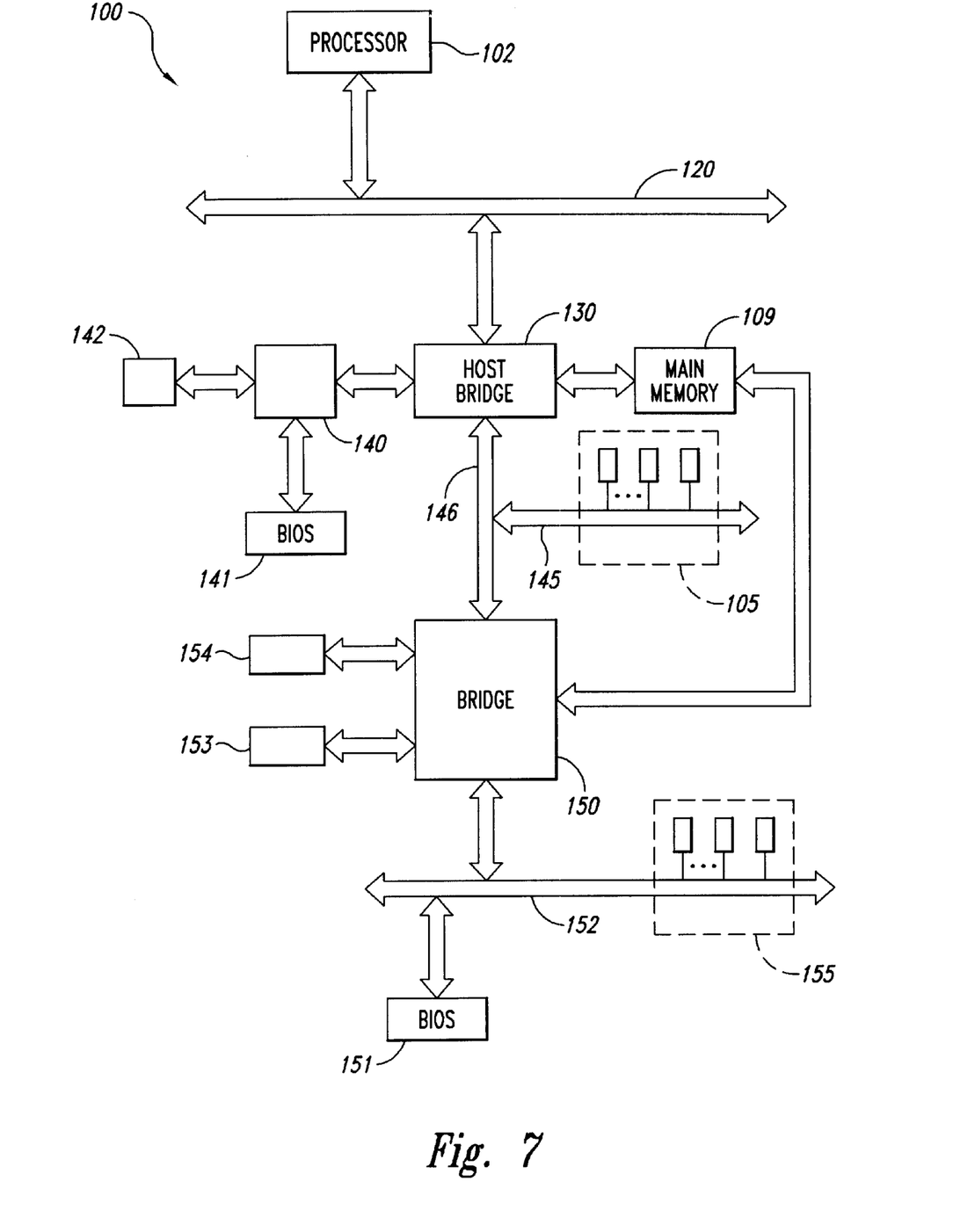
FIG. 7 illustrates an exemplary computer system for implementing the present method according to one embodiment of the present invention.

FIG. 7 illustrates a processor-based system 100 of conventional architecture including a processor 102 coupled to a host bus 120. The host bus 120 may be coupled to a host bridge 130. The host bridge 130 couples the processor 102 to a graphics device bridge 140, wherein, the graphics device bridge 140 operates under a conventional video BIOS 141 and may also be coupled to an I/O device such as a conventional computer monitor 142.

The host bridge 130 also couples the processor 102 to a main memory 109. The main memory 109 may also be coupled to a third bridge 150. The host bridge 130 is also coupled to the third bridge 150 through connecting bus 146. Connecting bus 146 also couples the host bridge 130 to a peripheral component interconnect (PCI) bus 145, which may, in turn, be coupled to several PCI slots 105, at least one of which may be coupled to a modem 74 in accordance with the present invention and which operates as described below with reference to FIGS. 1–6 and 8.

The third bridge 150 may also be coupled to at least one integrated drive electronics (IDE) port 154, and may also be coupled to at least one universal serial bus (USB) port 153. If a PCI connection is not used for the modem 74, a USB port 153 may be coupled to the modem 74 in accordance with the present invention and which operates as described below with reference to FIGS. 1–6 and 8.

The third bridge 150 may also be coupled to an industry standard architecture (ISA) bus 152 which is also coupled to a system BIOS 151. The ISA bus 152 may also be coupled to several ISA slots 155, one of which may be coupled to the modem 74 in accordance with the present invention and which operates as described below with reference to FIGS. 1–6 and 8, if the PCI or USB connections are not used.

The personal computer system 100 may be operated through an operating system such as Microsoft Windows. Alternate embodiments of the present invention could be implemented on personal computer systems with additional or different components or operating systems.

Another embodiment of the present invention may be implemented in a distributed computing environment in which a series of client computers share some or all of the above resources over a network with a central server computer. The various hardware needed to implement the alternative embodiments of the apparatus and method of the present invention will be apparent to a person skilled in the art.

Figure 1:
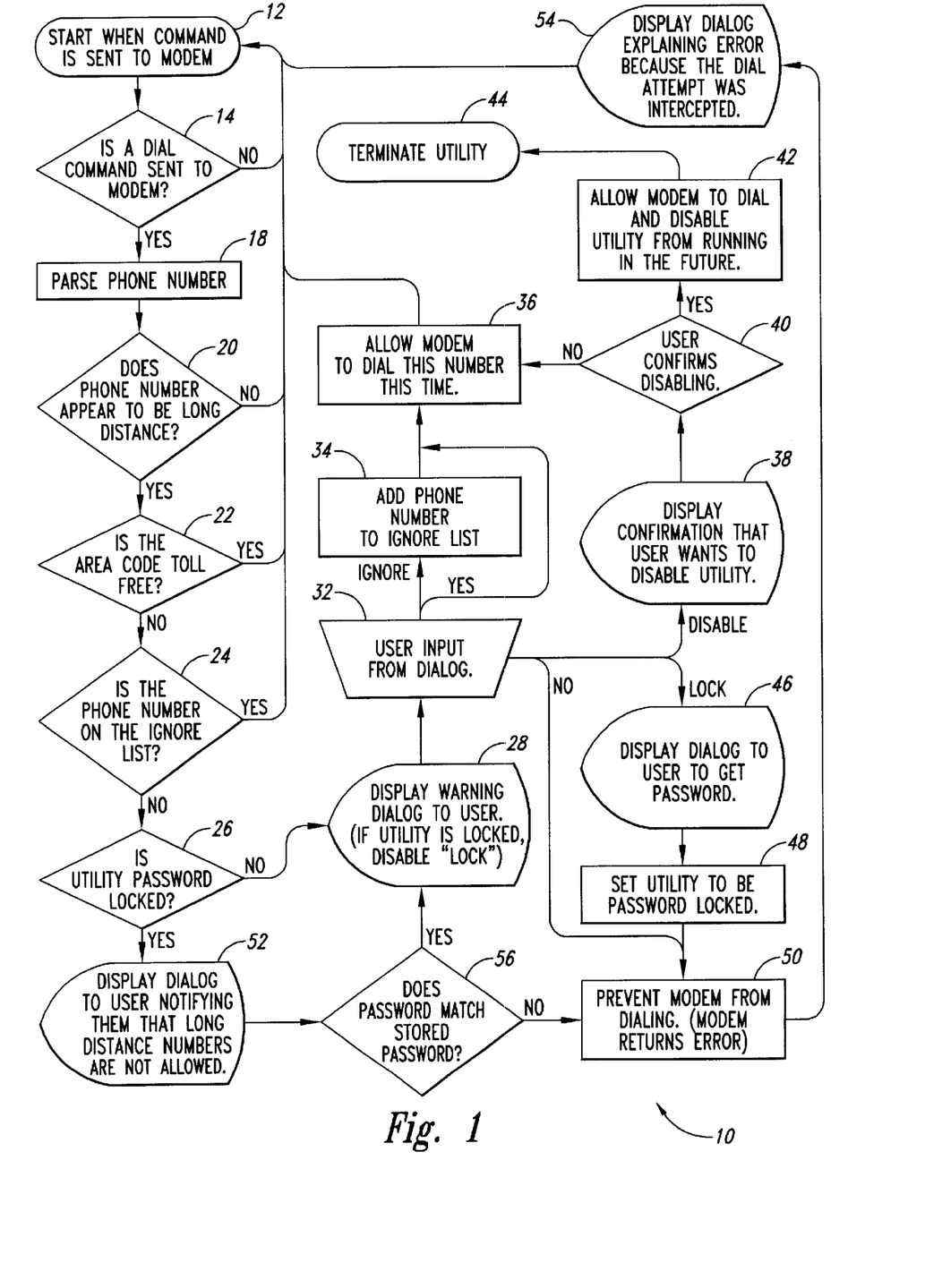
FIG. 1 illustrates in flowchart form a method of implementing one embodiment of the present invention.

An exemplary method 10 implemented as a software program for warning a computer user of proposed toll calls is illustrated in FIG. 1. The logic of one embodiment of the method 10 is described in the flow chart beginning at block 12 where a computer modem command is intercepted on its way to a computer modem by an observer module of the software program implementing the method 10. The computer modem command generally originates on the computer attached to the modem, but this is not required. In the usual case, a computer user will issue an instruction that results in a computer modem command being generated by a program activated by the user instruction. Because computer commands, including computer modem commands, are frequently issued in groups through a single user instruction, it is common for the computer user to discover that an intended instruction is causing one or more unintended consequences, including unintended computer modem commands. For that reason, it is desired that the method 10 intercept every computer modem command transmitted to the computer modem.

After a computer modem command is intercepted by the observer module at block 12, the command is analyzed by a gatekeeper module of the software program implementing the method 10 in blocks 14, 18, 20, and 22. The computer modem command is initially parsed at block 14, or separated into component data units, and any proposed telephone numbers to be dialed are extracted for further analysis. If no proposed telephone numbers are contained in the computer modem command, then the command is forwarded to the computer modem and the present method restarts and waits to intercept the next computer modem command at block 12.

If a proposed telephone number was contained in the computer modem command and extracted at block 14, this proposed telephone number is parsed again at block 18 into sub-units, such as area code, exchange, and extension sub-units. The sub-unit information is used at blocks 20 and 22 to determine whether the proposed telephone number would result in a "toll call," or telephone service charges over and above the usual monthly rate, if transmitted to the computer modem. This determination can be made by using information known to the local telephone service provider (TSP) to analyze the sub-unit information parsed at block 18. The exact mode of analysis will vary from TSP to TSP, but frequently involves testing multiple propositions, such as:

- whether the area code to be dialed matches any of the members of a prescribed list of local area codes;
- whether the area code to be dialed matches any of the members of a prescribed list of toll-free area codes;
- whether the exchange to be dialed matches any of the members of a prescribed list of local exchanges;
- whether the extension to be dialed matches any of the members of a prescribed list of local extensions; or
- whether the chosen service plan for the modem's present TSP connection allows an unlimited number of toll-free calls to a prescribed list of area codes, exchanges, or extensions.

At block 20, the telephone number is analyzed to determine whether telephone service charges would be accrued due to local/long distance characteristics of the proposed telephone number, for example an area code and exchange equal to the present area code and exchange.

If the determination is made at block 20 that the proposed telephone number would not result in a toll call, then the computer modem command is transmitted to the computer modem for processing and dialing of the proposed telephone number and the present method restarts at block 12. In contrast, if the proposed telephone number would result in a toll call, then the method 10 continues the toll analysis at block 22.

At block 22, the telephone number is analyzed to determine whether telephone service charges would be accrued for toll/toll-free characteristics of the proposed telephone number, for example an 800 area code. If the determination is made at block 22 that the proposed telephone number would not result in a toll call, then the computer modem command is transmitted to the computer modem for processing and dialing of the proposed telephone number and the present method restarts at block 12. In contrast, if the proposed telephone number would result in a toll call, then the method continues to the ignore list function at block 24.

Figure 5:
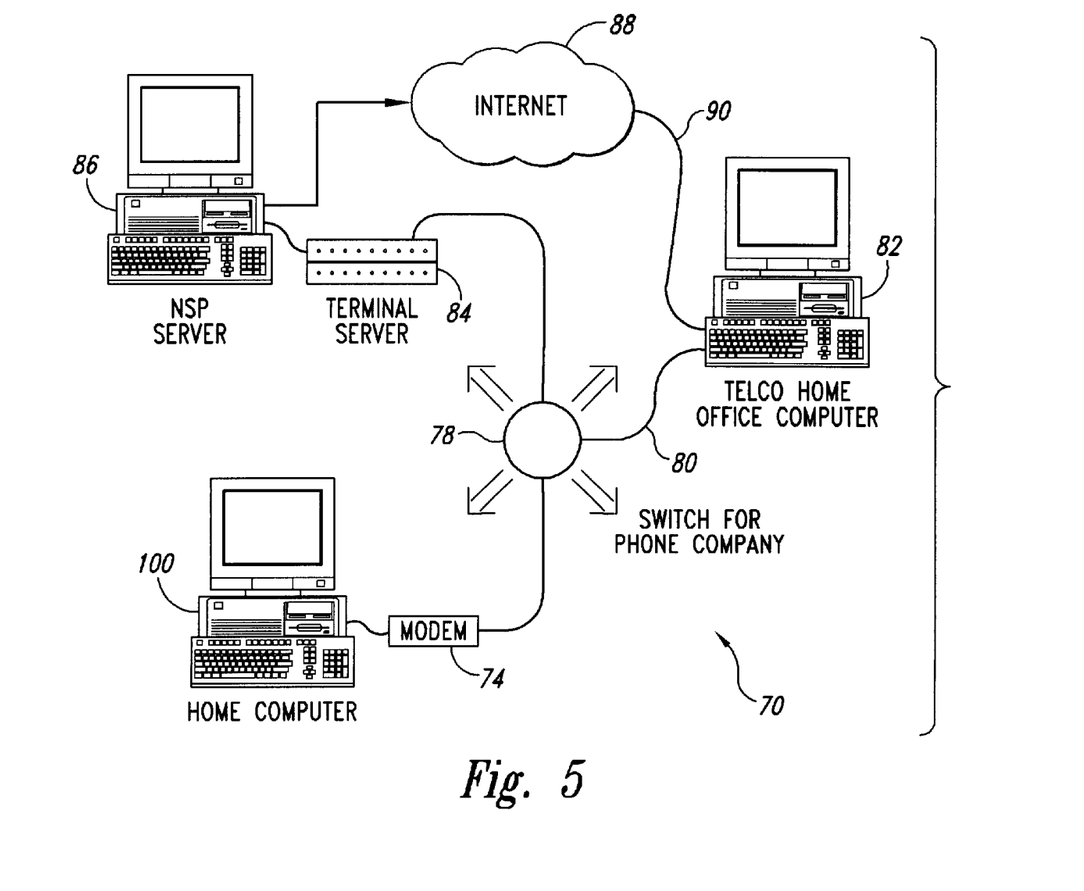
FIG. 5 illustrates an exemplary network configuration of several computers connected by telecommunications lines and implementing the present method according to one embodiment of the present invention.

One alternative embodiment of the present invention would automatically obtain toll call information for use in blocks 20 and 22 from the TSP as shown in FIG. 5. When the home computer 100 initiates a process of determining whether a proposed telephone number will result in a toll call, it sends a request via modem 74 to the local telephone service provider for information. This request can take the form of a one-time telephone connection 80 through the local telephone switch 78 to the TSP server computer 82, which would respond to the request by transmitting toll call criteria, such as the prescribed lists of local area codes, exchanges, and extensions noted in the above examples, back to the home computer 100. The request can also take the form of a network protocol query 90 after the modem 74 has dialed a previously-chosen network service provider (NSP) and connected through its terminal server 84 to its server 86 in order to access the Internet 88 or a similar network. Such a network protocol query 90 would reach the TSP server computer 82 through the Internet 88 or other network, and the TSP server computer 82 would respond by transmitting the toll call information requested back to the home computer 100 through a similar network path. Thereafter, the home computer would use the TSP-transmitted information to determine whether the proposed telephone number would result in a toll call.

Another alternative embodiment would require that toll call information be obtained from the TSP by the computer user and manually entered prior to use of the present invention. For many geographic locations, toll information changes infrequently and periodic updates would be sufficient for operation of the present method. The manually entered information is then used at blocks 20 and 22 to determine whether the proposed telephone number would result in a toll call, thereby avoiding the step of going online or making a separate call to the TSP.

If the determination is made at blocks 20 or 22 that the proposed telephone number would not result in a toll call, then the computer modem command is transmitted to the computer modem for processing and dialing of the proposed telephone number and the present method restarts at block 12. In contrast, if the proposed telephone number would result in a toll call, then the method continues to the ignore list function at block 24.

The method 10 of the present invention allows the computer user to compile an "ignore list" of approved telephone numbers. This ignore list function 24 allows the primary computer user to pre-approve all telephone numbers to be dialed by the computer modem and hence prevent secondary computer users, such as employees, guests, or children, from using the modem to dial any non-approved telephone numbers. The ignore list is entered using the configuration module, as illustrated in FIG. 8.

Figure 8:
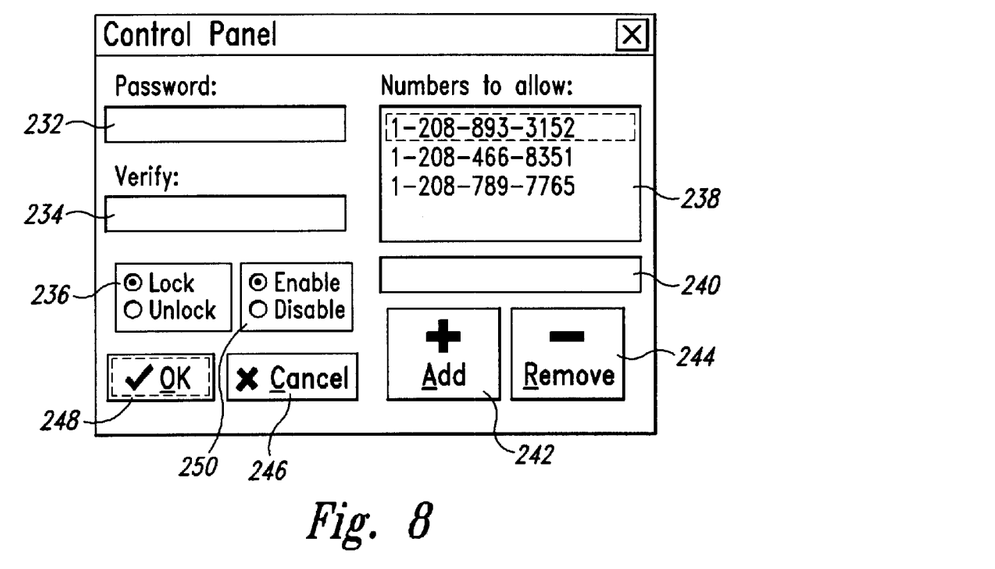
FIG. 8 illustrates an exemplary screen image of the configuration module according to one embodiment of the present invention.

FIG. 8 illustrates the operation of the configuration module, which can function as a standalone program, for example a control panel "applet" or operating system utility in Microsoft Windows. The purpose of the configuration module is to receive and store approved telephone numbers for use by the ignore list function at 24 in FIG. 1. Referring to FIG. 8, approved telephone numbers can be entered by inputting a series of digits in the number input dialog 240 and then selecting the add dialog 242. Approved telephone numbers can be disapproved or removed by highlighting a number in the number display dialog 238 and selecting the remove dialog 244. In addition, the configuration module can be used to enable and disable use of the method 10 entirely at enabling radio buttons 250 or to enable and disable the password locking function, described below, using the password enabling dialog 236. Once the password locking function is enabled by choosing "Lock" in the password enabling dialog 236, the user may enter an authorization password at 232 and repeat that authorization password at 234. To set the password entered at 232 and 234 as the authorization password, the user must select the OK dialog 248. To cancel this operation or other changes made to the authorization module, the user must select the Cancel dialog 246.

During operation of the ignore list function 24, if the proposed telephone number is equal to one or more members of the ignore list, it is an approved telephone number and the computer modem command is transmitted to the computer modem at block 24. The present method then restarts at block 12. However, if the proposed telephone number does not match any of the members of the ignore list, the method of the present invention may follow either one of two different paths at block 26 depending on whether a password locking function has previously been enabled.

The password locking function will be described below, and its selection allows the computer user to designate an authorization password, such as a series of alphanumeric characters, that must be entered whenever a toll call is to be placed using the computer modem if the proposed telephone number is not a member of the ignore list. For example, a computer user instructs a computer program to dial a specific telephone number for which a toll will be charged if dialed, and the telephone number does not match a member of the ignore list. If the password locking function is enabled, the computer user must input a password exactly equal to the authorization password previously designated before the system will permit the toll call to be placed. This aspect of the present invention allows the primary computer user to prevent telephone service charges from being accrued by secondary computer users, such as employees, children, or guests.

The method of the present invention requires sensing the state of the password locking function at block 26, and proceeding to block 52 if it is enabled and to the interactive module at block 28 if it is not enabled. If the password locking function has been enabled, a message is displayed to the computer user at block 52 explaining that toll calls will not be permitted and the password must be entered if the toll call is to be placed. It is desirable to combine the explanatory message with the prompt for an input password as shown in the sample screen image of FIG. 3. The input password is compared to the previously-entered authorization password at block 56. If the input password matches the authorization password, the password locking function is disabled and the method continues at block 28. If the input password does not match the authorization password, transmission of the computer modem command to the computer modem is prevented at block 50, and an explanatory error message is displayed to the computer user at block 58. The method 10 then restarts at block 12.

Figure 2:
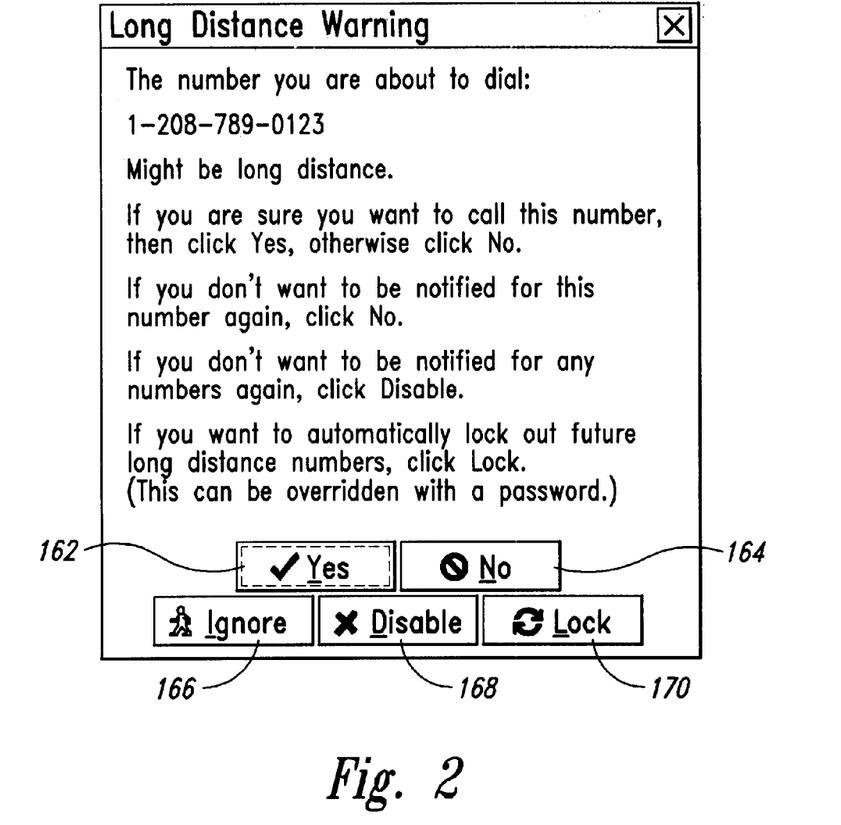
FIG. 2 illustrates an exemplary screen image for warning a computer user of a toll call according to one embodiment of the present invention.
Figure 3:
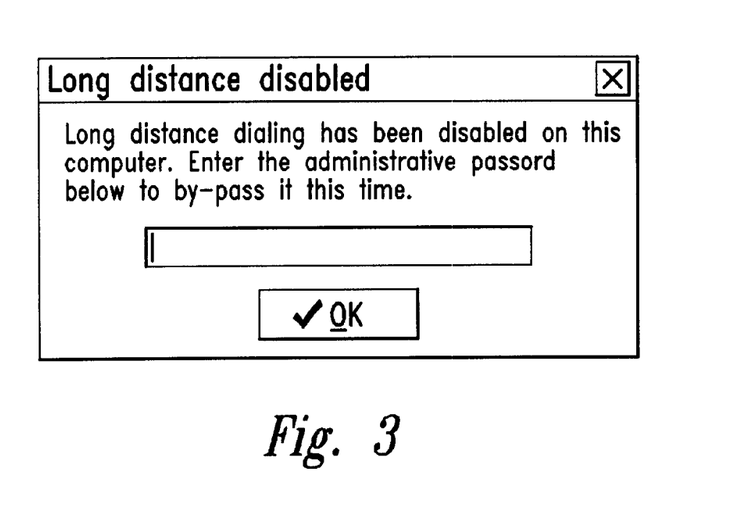
FIG. 3 illustrates an exemplary screen image for prompting the computer user to enter an input password according to one embodiment of the present invention.

If it is determined that the password locking function is disabled at block 26 or if a computer user enters an input password equal to the authorization password when prompted at block 52, the interactive module of the software program implementing the method 10 displays a toll call warning message at block 28, as shown in FIG. 2. This warning message serves to alert the computer user that a computer instruction was issued which would result in a toll call and to solicit from the computer user further instructions. The computer user then supplies an instruction by choosing one of several options at block 32. Five different toll warning options may be chosen, as shown in FIG. 2, based on user preference, including (1) ignore 166, (2) yes 162, (3) no 164, (4) lock 170, and (5) disable 168.

The first toll warning option, ignore 166, adds the proposed telephone number to the ignore list at block 34 and transmits the computer modem command to the modem. This option effectively approves the proposed telephone number for all future computer modem commands and the computer user will not henceforth be warned before placing a toll call to this particular telephone number.

The second toll warning option, yes 162, transmits the computer modem command to the computer modem but does not add the proposed telephone number to the ignore list. This option permits the computer user to dial the proposed telephone number at block 36 this one time, but future computer modem commands attempting to dial this proposed telephone number will result in a similar warning.

The third toll warning option, no 164, is available to the computer user at block 32 to prevent the computer modem from placing the toll call at block 50. An explanatory error message is subsequently displayed to the computer user at block 58.

For the ignore 166, yes 162, or no 164 options, the method 10 then restarts at block 12, waiting to intercept the next computer modem command.

Figure 4:
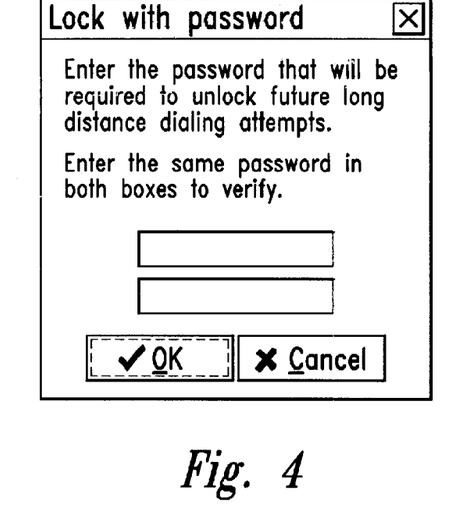
FIG. 4 illustrates an exemplary screen image for prompting the computer user to enter an authorization password according to one embodiment of the present invention.

If the fourth toll warning option, lock 170, is chosen, the computer user intends to enable the password locking function discussed earlier. A message is displayed at block 46 prompting the computer user to enter an authorization password, the password locking function is enabled at block 48, and the computer modem command is then prevented from being transmitted to the computer modem at block 50. It is desirable to force the computer user to enter the authorization password twice, as shown in FIG. 4. If two differing passwords are entered at block 46, the user prompt would be repeated and the computer user would be required to re-enter both passwords until the same password is entered in both spaces for entry shown in FIG. 4. After the computer modem command is prevented at block 50, an explanatory error message is displayed to the computer user at block 58 and the present method restarts to await the next computer modem command at block 12.

If the fifth toll warning option, disable 168, is chosen, the computer user signals an intention to disable use of the present invention for all future computer modem commands. Because no future warnings would be displayed, a confirmation dialog would be displayed at block 38, giving the computer user the option at block 40 to either confirm disabling or not confirm disabling. If the computer user confirms disabling, the computer modem command is transmitted to the computer modem at block 42 and the proposed telephone number is dialed, future modem commands would not be intercepted or analyzed, and operation of the method 10 would terminate at block 44. On the other hand, if the computer user chooses not to confirm disabling, the computer modem command is transmitted to the computer modem at block 36 and the method 10 restarts to await the next computer modem command at block 12. Choosing the fifth toll warning option disable 168 and then choosing not to disable the system is thus equivalent to choosing the second toll warning option, yes 162.

Figure 6:
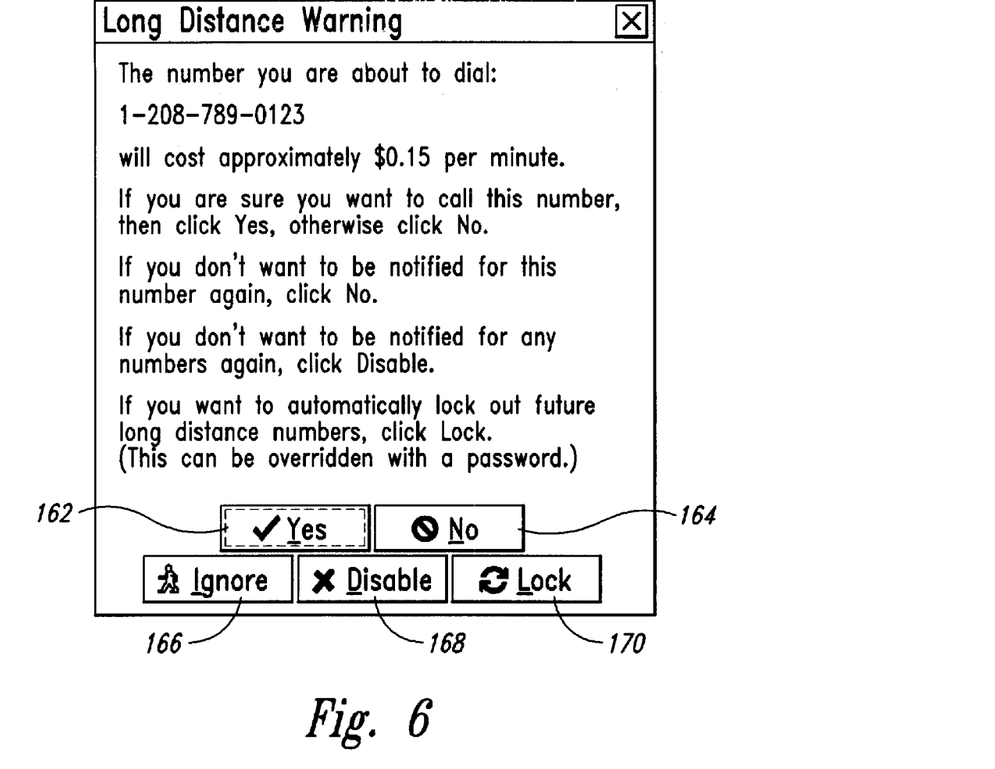
FIG. 6 illustrates an exemplary screen image for warning a computer user of a toll call and including approximate rate information according to one embodiment of the present invention.

One alternative embodiment of the present invention would display rate information along with the toll warning message at block 28. It would be useful to computer users presented with the choice of whether to dial a proposed telephone number to know what the proposed toll call would cost, in addition to the usual monthly billing rate. In this alternative embodiment, toll information describing the approximate rate for the proposed toll call would be obtained in addition to the fact of additional telephone service charges at blocks 20 and 22, allowing such data to be included in the toll warning message displayed at block 28. FIG. 6 shows a sample screen image of the toll warning message including approximate rate information. This alternative embodiment would allow the computer user to make a more informed choice when considering whether to allow the proposed toll call.

The present invention also includes a remote administration module for operation on a server computer which is capable of remotely configuring a series of client computers. The remote administration module is useful for employers operating in a client/server networked computing environment in which control of modem dialing would be desirable. For example, if an employer wished to prohibit all employee computer users from using a computer modem to dial any telephone number not on a list of approved telephone numbers, the remote administration module could be used to enter the approved list once and propagate the list to all employee computers. The present invention also permits the authorization password to be similarly designated and propagated with the remote administration module.

It must be noted that the present invention is implemented as a program which gets executed on a computer system. The invention can be written in different computer languages for different computer systems. The present invention can be stored on a hard drive, floppy disc, CD-ROM or other permanent or semi-permanent storage medium. The program embodying the present invention can also be divided into program code segments, downloaded, for example, from a server computer or transmitted as a data signal embodied in a carrier wave or light signal as is known in the art.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of limiting use of a first computer having a first computer modem, comprising the acts of:

receiving a computer modem command before it reaches any computer modem;

analyzing the computer modem command to identify any telephone number contained in the computer modem command and transmitting the computer modem command to the first computer modem if no telephone number is identified;

if a telephone number is identified, analyzing the identified telephone number prior to transmitting the computer modem command to the first computer modem and determining whether said computer modem command will result in a toll call by the first computer modem;

transmitting the computer modem command to the first computer modem if no toll call will result; and providing a toll warning message to a user of the first computer if said toll call will result.

2. The method of claim 1 wherein toll data supplied by a telecommunications service provider is used to determine whether said computer modem command will result in said toll call.

3. The method of claim 1 wherein said toll warning message further provides rate information describing an approximate cost of said toll call.

4. The method of claim 1 further comprising the act of:
    transmitting said computer modem command to said computer modem if said toll call will not result.

5. The method of claim 1 further comprising the act of:
    preventing said computer modem command from being transmitted to the first computer modem if said toll call will result.

6. The method of claim 1 further comprising the acts of:
    determining whether to transmit said computer modem command to the first computer modem if said toll call will result; and transmitting said computer modem command to the first computer modem if it is determined that said computer modem command should be transmitted.

7. The method of claim 6 further comprising the act of:
    preventing said computer modem command from being transmitted to the first computer modem if it is determined that said computer modem command should not be transmitted.

8. The method of claim 1 further comprising the acts of:
    receiving an authorization password at a first time;

receiving an input password at a second time when said computer modem command will result in said toll call;

comparing said input password with said authorization password; and transmitting said computer modem command to the first computer modem if said input password matches said authorization password.

9. The method of claim 8 further comprising the act of:
    preventing transmission of said computer modem command to the first computer modem if said input password does not match said authorization password.

10. The method of claim 1 further comprising the acts of:
    comparing the identified telephone number to each of a plurality of approved telephone numbers if a telephone number is identified in the computer modem command; and transmitting said computer modem command to the first computer modem if the identified telephone number matches one or more approved telephone numbers.

11. The method of claim 9 further comprising the acts of:
    designating said authorization password for a plurality of client computers attached to a network from a server computer attached to said network, the plurality of client computers including the first computer; and constraining said authorization password for each of said client computers to be the same as the authorization password designated from said server computer.

12. The method of claim 10 further comprising the acts of:
    designating said plurality of approved telephone numbers for a plurality of client computers attached to a network from a server computer attached to said network, the plurality of client computers including the first computer; and constraining said plurality of approved telephone numbers for each of said client computers to be the same as the plurality of approved telephone numbers designated from said server computer.

13. A computer readable storage medium containing a computer readable code for operating a first computer to perform a method of limiting use of the first computer, said method comprising the acts of:

receiving a computer modem command before it reaches any computer modem;

analyzing the computer modem command to identify any telephone number contained in the computer modem command and transmitting the computer modem command to the first computer modem if no telephone number is identified;

if a telephone number is identified, analyzing the identified telephone number prior to transmitting the computer modem command to the first computer modem and determining whether said computer modem command will result in a toll call by the first computer modem;

transmitting the computer modem command to the first computer modem if no toll call will result; and providing a toll warning message to a user of the first computer if said toll call will result.

14. The computer readable storage medium of claim 13 wherein said method further comprises the act of using toll data supplied by a telecommunications service provider to determine whether said computer modem command will result in said toll call.

15. The computer readable storage medium of claim 13 wherein said method further comprises the act of providing rate information describing an approximate cost of said toll call within said toll warning message.

16. The computer readable storage medium of claim 13 wherein said method further comprises the act of transmitting said computer modem command to said computer modem if said toll call will not result.

17. The computer readable storage medium of claim 13 wherein said method further comprises the act of preventing said computer modem command from being transmitted to the first computer modem if said toll call will result.

18. The computer readable storage medium of claim 13 wherein said method further comprises the act of determining whether to transmit said computer modem command to the first computer modem if said toll call will result, and transmitting said computer modem command to the first computer modem if it is determined that said computer modem command should be transmitted.

19. The computer readable storage medium of claim 18 wherein said method further comprises the act of preventing said computer modem command from being transmitted to the first computer modem if it is determined that said computer modem command should not be transmitted.

20. The computer readable storage medium of claim 13 wherein said method further comprises the acts of receiving an authorization password at a first time, receiving an input password at a second time when said computer modem command will result in said toll call, comparing said input password with said authorization password, and transmitting said computer modem command to the first computer modem if said input password matches said authorization password.

21. The computer readable storage medium of claim 20 wherein said method further comprises the act of preventing transmission of said computer modem command to the first computer modem if said input password does not match said authorization password.

22. The computer readable storage medium of claim 13 wherein said method further comprises the acts of comparing the identified telephone number to each of a plurality of approved telephone numbers if a telephone number is identified in the computer modem command, and transmitting said computer modem command to the first computer modem if the identified telephone number matches one or more approved telephone numbers.

23. The computer readable storage medium of claim 21 wherein said method further comprises the act of designating said authorization password for a plurality of client computers attached to a network from a server computer attached to said network, the plurality of client computers including the first computer, and constraining said authorization password for each of said client computers to be the same as the authorization password designated from said server computer.

24. The computer readable storage medium of claim 22 wherein said method further comprises the act of designating said plurality of approved telephone numbers for a plurality of client computers attached to a network from a server computer attached to said network, the plurality of client computers including the first computer, and constraining said plurality of approved telephone numbers for each of said client computers to be the same as the plurality of approved telephone numbers designated from said server computer.

25. A system for preventing unauthorized use of a computer comprising:
   a modem; and
   a programmed processor, said programmed processor being programmed to intercept every modem command before the modem command reaches said modem; analyze the modem command to identify any telephone number contained in the modem command and transmit the modem command to the modem if no telephone number is identified; analyze any identified telephone number prior to transmitting the modem command to the modem and determine whether said modem command will result in a toll call by said modem; transmit the modem command to the modem if no toll call will result; and provide a toll warning message to a user if said toll call will result.

26. The system of claim 25 further comprising a display, wherein said processor provides said toll warning message to said user by causing said display to exhibit said toll warning message.

27. The system of claim 25 wherein said processor is further programmed to use toll data supplied by a telecommunications service provider to determine whether said computer modem command will result in said toll call.

28. The system of claim 25 wherein said processor is further programmed to display rate information describing an approximate cost of said toll call within said toll warning message.

29. The system of claim 25 wherein said processor is further programmed to transmit said modem command to said modem if said toll call will not result.

30. The system of claim 25 wherein said processor is further programmed to prevent said modem command from being transmitted to said modem if said toll call will result.

31. The system of claim 25 wherein said processor is further programmed to determine whether to transmit said modem command to said modem if said toll call will result, and transmit said modem command to said modem if it is determined that said modem command should be transmitted to said modem.

32. The system of claim 31 wherein said processor is further programmed to prevent transmission of said modem command to said modem if it is determined that said modem command should not be transmitted to said modem.

33. The system of claim 25 wherein said processor is further programmed to receive an authorization password at a first time, receive an input password at a second time when said modem command will result in said toll call, compare said input password with said authorization password, and transmit said modem command to said modem if said input password matches said authorization password.

34. The system of claim 33 wherein said processor is further programmed to prevent transmission of said modem command to said modem if said input password does not match said authorization password.

35. The system of claim 25 wherein said processor is further programmed to detect a proposed telephone number within said modem command, compare said proposed telephone number to each of a plurality of approved telephone numbers if said modem command contains said proposed telephone number, and transmit said modem command to said modem if said proposed telephone number matches one or more approved telephone numbers.

36. The system of claim 34 wherein said processor is further programmed to permit the designation of said authorization password for a plurality of client computers attached to a network from a server computer attached to said network, and constrain said authorization password for each of said client computers to be the same as the authorization password designated from said server computer.

37. The system of claim 35 wherein said processor is further programmed to permit the designation of said plurality of approved telephone numbers for a plurality of client computers attached to a network from a server computer attached to said network, and constrain said plurality of approved telephone numbers for each of said client computers to be the same as the plurality of approved telephone numbers designated from said server computer.

* * * * *

UNITED STATES PATENT AND TRADEMARK OFFICE
CERTIFICATE OF CORRECTION

PATENT NO.    : 6,411,693 B1
DATED         : June 25, 2002
INVENTOR(S)   : James A. McKeeth It is certified that error appears in the above-identified patent and that said Letters Patent is hereby corrected as shown below:

<u>Column 2,</u>
Line 8, "noting" should be -- notifying --;

Signed and Sealed this

Eleventh Day of March, 2003

JAMES E. ROGAN
*Director of the United States Patent and Trademark Office*